(12) United States Patent
Takeda

(10) Patent No.: US 7,133,340 B2
(45) Date of Patent: Nov. 7, 2006

(54) OPTICAL DISC APPARATUS

(75) Inventor: Naoto Takeda, Tokyo (JP)

(73) Assignee: TEAC Corporation, Musahino (JP)

( * ) Notice: Subject to any disclaimer, the term of this patent is extended or adjusted under 35 U.S.C. 154(b) by 460 days.

(21) Appl. No.: 10/253,856

(22) Filed: Sep. 24, 2002

(65) Prior Publication Data

US 2003/0058758 A1 Mar. 27, 2003

(30) Foreign Application Priority Data

Sep. 25, 2001 (JP) ............... 2001-292579

(51) Int. Cl.
*G11B 7/00* (2006.01)
(52) U.S. Cl. ............... 369/53.19; 369/44.32; 369/44.34
(58) Field of Classification Search ........... 369/44.32, 369/44.41, 53.19, 109.01, 116, 59.12, 53.14, 369/44.34
See application file for complete search history.

(56) References Cited

U.S. PATENT DOCUMENTS

| 5,483,512 | A * | 1/1996 | Yanagawa | 369/53.19 |
| 5,523,989 | A * | 6/1996 | Ishibashi | 369/44.32 |
| 6,282,161 | B1 | 8/2001 | Son et al. | |
| 6,363,039 | B1 * | 3/2002 | Hayashi et al. | 369/44.32 |
| 6,430,130 | B1 * | 8/2002 | Furukawa | 369/53.19 |
| 6,526,007 | B1 * | 2/2003 | Fujita | 369/44.32 |
| 6,678,222 | B1 * | 1/2004 | Schröder et al. | 369/44.32 |
| 6,680,887 | B1 * | 1/2004 | Shihara et al. | 369/44.32 |
| 6,788,627 | B1 * | 9/2004 | Aikoh et al. | 369/44.32 |

FOREIGN PATENT DOCUMENTS

| JP | 60066341 | 4/1985 |
| JP | 3023525 | 1/1991 |
| JP | 4010237 | 1/1992 |
| JP | 2000-298861 | 10/2000 |
| JP | 2000-331364 | 11/2000 |
| JP | 2001-184690 | 7/2001 |
| JP | 2000-76653 | 3/2003 |

* cited by examiner

*Primary Examiner*—Thang V. Tran
*Assistant Examiner*—Kim-Kwok Chu
(74) *Attorney, Agent, or Firm*—Christensen O'Connor Johnson Kindness PLLC

(57) ABSTRACT

An optical disc apparatus in which the inclination of an optical axis of laser light relative to an optical disc is adjusted. When data is recorded, laser light is irradiated at recording power in mark periods and irradiated at reproducing power or erasing power in space periods. Immediately after the beginning of the mark periods, no pits are ye formed even though recording power is applied and the amount of reflected light has a level corresponding to the inclination of the optical axis of laser light relative to the optical disc without influence exerted by the pits. Also in the space period, the amount of reflected light has a level corresponding to the inclination of the optical axis of laser light relative to the optical disc. By sampling the reflected light signal at the instant following to the beginning of the mark period or space periods, the inclination is adjusted so as to maximize the sampled signal level.

7 Claims, 9 Drawing Sheets

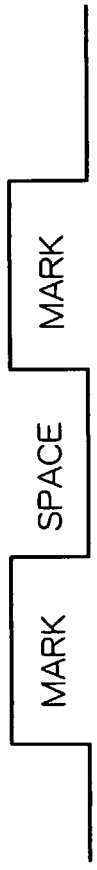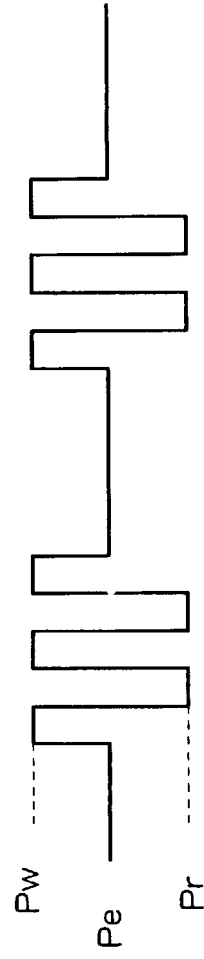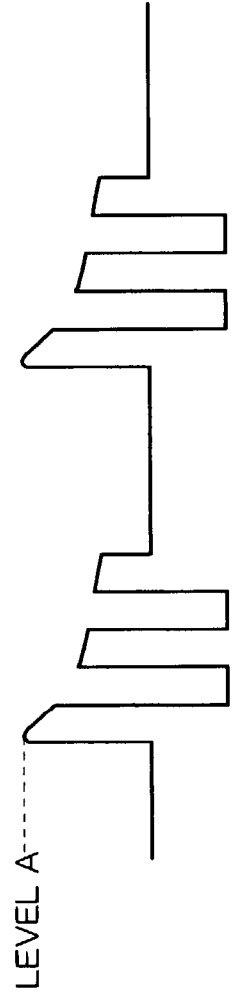
Fig. 9A
Fig. 9B
Fig. 9C
Fig. 9D

OPTICAL DISC APPARATUS

BACKGROUND OF THE INVENTION

1. Field of the Invention

The present invention relates to an optical disc apparatus, and more particularly to an adjustment to the inclination (tilt) of an optical disc relative to an optical axis of laser light.

2. Description of the Related Art

A recordable optical disc apparatus such as a CD-R/RW drive or a DVD-R/RW drive has a problem that stability of data recording/reproducing cannot be maintained when an optical disc tilts relative to an optical axis of laser light (in a tilt state). Accordingly, a technology for providing a tilt sensor to the optical disc to detect the amount of tilt and adjusting the inclination of an optical pickup according to the detected amount of tilt has been proposed.

A block diagram of an optical disc apparatus with a tilt sensor is outlined in FIG. 10. An optical disc 10 is driven by a spindle motor 12 to be rotated. An optical pickup 14 is placed so as to be opposed to the optical disc 10. Laser light irradiated from the optical pickup 14 toward the optical disc 10 is reflected from the optical disc 10 and converted to an electric signal at a photo detector provided in the optical pickup 14. The signal from the optical pickup 14 is provided to an RF signal processor in which a tracking error signal TE and focus error signal FE are generated and provided to a tracking controller 50 for controlling tracking of the optical pickup 14 and focus controller 52 for controlling focusing of the optical pickup 14, respectively.

A tilt sensor 54, which is independent from the optical pickup 14, is installed opposed to the optical disc 10 to detect the amount of tilt. Information on the amount of tilt detected by the tilt sensor 54 is passed to a tilt driver 56 which adjusts the inclination of the optical pickup 14 so as to cause the amount of tilt detected by the tilt sensor 54 to approach zero. As a result, the optical axis of laser light is controlled to be almost perpendicular to the optical disc 10.

FIG. 11 shows the structure of the tilt sensor 54 of FIG. 10. The tilt sensor 54 includes a laser diode (LD) 54a, a two-segmented photo detector 54b and a differential amplifier 54c. Laser light irradiated from the LD54a is reflected from the optical disc 10 and then enters the two-segmented photo detector 54b comprising two detectors A and B where laser light is converted to an electrical signal. The LD54a and the two-segmented photo detector 54b are placed in such a manner that the same amount of reflected laser light enters both two detectors A and B in the two-segmented photo detector 54b when the amount of tilt of the optical disc 10 is zero. Accordingly, when the amount of tilt of the optical disc 10 is zero, the quantities output from the detectors A and B in the two-segmented photo detector 54b are equal to each other, with a result that there is no output from the differential amplifier 54c, in other words no tilt error signal is output.

On the other hand, when the optical disc 10 is inclined, the balance of incident quantities between the detectors A and B will be lost causing the quantities output from the detectors A and B to be unequal. As a result, the tilt error signal is output from the differential amplifier 54c. Because a signal level of the tilt error signal is proportional to the amount of tilt of the optical disc 10, the tilt driver 56 can adjust the inclination of the optical pickup 14 in accordance with the signal level of the tilt error signal.

However, the above-described structure in which the tilt sensor 54 is installed independently from the optical pickup 14 to detect the amount of tilt has a problem that the tilt error signal from the tilt sensor 54 does not precisely reflect the inclined amount of the optical disc 10 relative to the optical pickup 14. This problem is not resolved by placing the tilt sensor 54 in the vicinity of the optical pickup 14. Further, there is another problem that the overall cost of the apparatus is increased by providing a separate tilt sensor 54.

Another structure for performing tilt control based on the amount of returned laser light which is irradiated from an optical pickup toward an optical disc and then reflected from the optical disc, without providing a separate tilt sensor is disclosed in Japanese Patent Laid Open Publication 2001-184690. More specifically, the tilt is here controlled so as to keep the maximum value among the amounts of reflected light obtained when laser light at reproducing power, erasing power, and recording power is irradiated to an optical disc at a smaller level (i.e. to make the amount of reflected light obtained when recording power is applied smaller). By irradiation of laser light at recording power, marks are formed on the optical disc. However, the occurrence of tilt reduces the power of the laser light incident to the optical disc surface and causes failure of forming marks due to insufficient power, with a result that reflectance is not decreased. The amount of tilt, therefore, is controlled by executing an adjustment for minimizing the amount of reflected laser light.

As described above, when laser light is irradiated onto the optical disc at an angle, desired marks are not formed due to the reduced power of the laser at the optical disc surface. When this happens, however, the amount of reflected light transmitted to the photo detector is also reduced by the angled irradiation of laser light onto the optical disc. The increase of reflectance due to mark forming failure for lack of power caused by the tilt of incident laser light and the decrease of the amount of reflected light itself caused by the tilt are canceled out each other. Accordingly, such a structure for minimizing the amount of reflected laser light may cause inaccurate control of the amount of tilt.

SUMMARY OF THE INVENTION

It is therefore an object of the present invention to adjust tilt of an optical disc relative to an optical axis of laser light.

An optical disc apparatus according to the present invention comprises irradiation means for irradiating laser light onto an optical disc, detection means for detecting the amount of light reflected from the optical disc, sampling means for sampling the amount of reflected light at predetermined timing, and adjustment means for adjusting the inclination of an optical axis of laser light relative to the optical disc so as to increase the amount of reflected light obtained at the predetermined timing.

In an example configuration of the present invention, said sampling means samples the amount of reflected light obtained immediately after irradiation of laser light at recording power. When laser light is irradiated at recording power, the amount of reflected light increases at the instant following the starting of irradiation in a brief period of time. Subsequently, a recording film is fused and sublimated by recording power, or a crystalline state of the recording film is shifted to an amorphous state so that pits are formed. The occurrence of the pits causes the amount of reflected light to decrease. Because the amount of reflected light obtained when no pits are formed depends on the inclination of the optical axis of laser light relative to the optical disc during irradiation of laser light at recording power, the amount of reflected light reaches a peak when the tilt is zero, that is, when laser light is irradiated onto the optical disc from a direction almost perpendicular to the optical disc. Accordingly, by using a level of the amount of reflected light obtained immediately after irradiation of laser light at recording power, it becomes possible to perform tilt control without influence exerted by the pits.

In another configuration of the present invention, said sampling means samples the amount of reflected light obtained when laser light is irradiated at reproducing power or erasing power. For CD-R, DVD-R or the like, laser light is irradiated at reproducing power during mark periods and space periods between the mark periods. In the space periods, the amount of reflected light is not influenced by the pits and maintains a level corresponding to the inclination of the optical axis of laser light relative to the optical disc. On the other hand, for CD-RW, DVD-RW, or the like, laser light is irradiated at erasing power during the space periods. By applying erasing power adequately, the pits which have already been formed can be deleted in spite of a certain degree of the tilt. After deletion of the pits, the amount of reflected light maintains a level corresponding to the inclination of the optical axis of laser light relative to the optical disc without influence exerted by the pits. In either case, by using the level of the amount of reflected light during the space periods, it becomes possible to perform tilt control. Here, it should be noted that when erasing power is inadequate and tilt exists, some of the pits remain not erased because the power applied to the optical disc is reduced by the tilt, with a result that the remaining pits reduces the amount of reflected light. Further, the amount of reflected light itself is decreased by the tilt. Because the action of both the remaining pits and the tilt causes the amount of reflected light to decrease, the tilt may be controlled, even when some of the pits remain not erased due to inadequate erasing power, by adjusting so as to increase the amount of reflected light.

The tilt control according to the present invention may be executed only once after insertion of the optical disc, or may be repeated periodically at established time intervals while data is recorded/reproduced.

Although the present invention will be clearly understood by reference to the following embodiment, the scope of the present invention is not limited to the embodiment.

BRIEF DESCRIPTION OF THE DRAWINGS

FIG. 9A is a timing chart for a recording data signal;

FIG. 9B is a timing chart for a recording pulse signal corresponding to the recorded data shown in FIG. 9A;

FIG. 9C is a timing chart for a reflected light signal at the recorded pulses shown in FIG. 9B;

FIG. 9D is a timing chart for a sampling pulse;

DESCRIPTION OF THE PREFERRED EMBODIMENT

Figure 1:
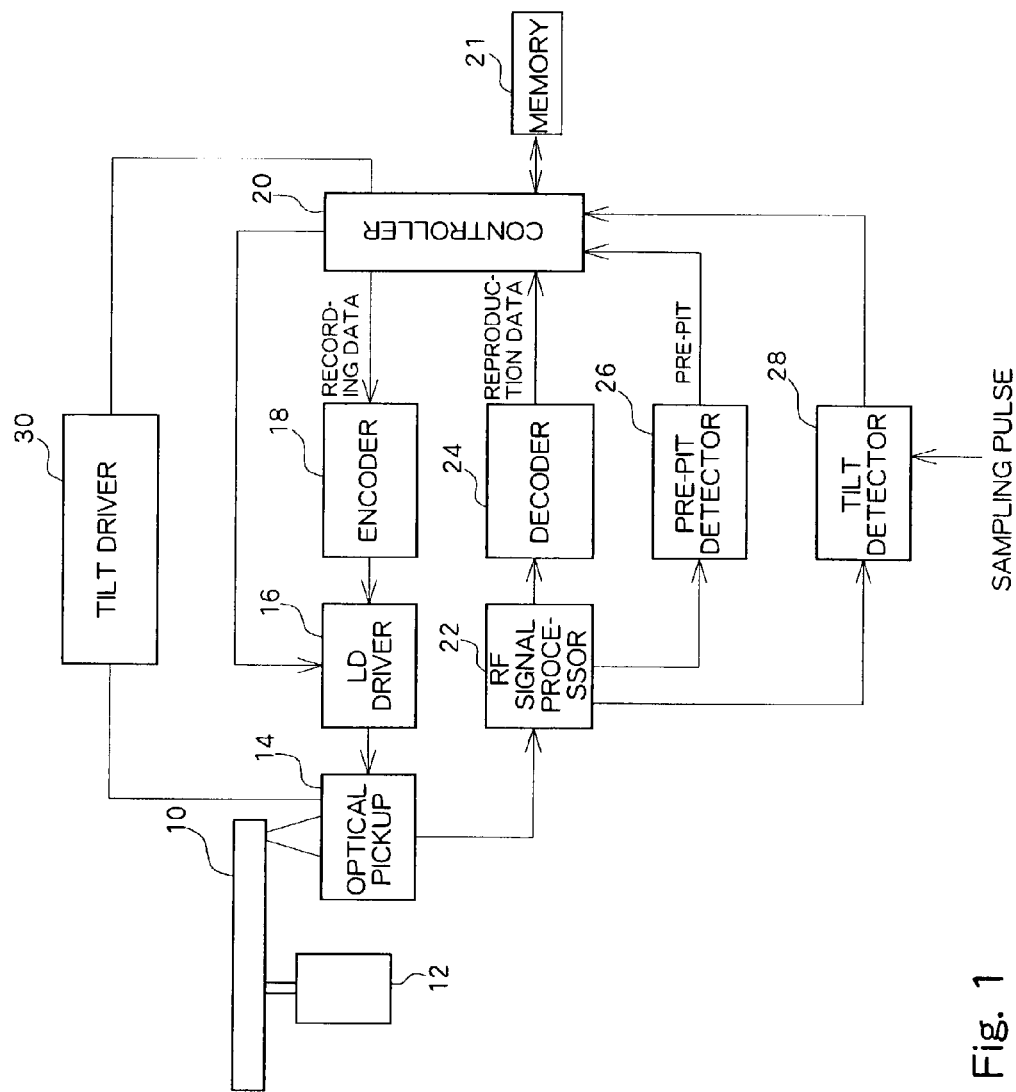
FIG. 1 is a block diagram showing a configuration of an optical disc apparatus.

A preferred embodiment of the present invention will be described below while referring to the drawings.

FIG. 1 is a block diagram showing a configuration of an optical disc apparatus according to the present embodiment. An optical disc 10 is driven by a spindle motor 12 to be rotated at CAV (or CLV).

An optical pickup 14 placed so as to oppose the optical disc 10 irradiates laser light at recording power onto the optical disc 10 to record data, or irradiates laser light at reproducing power onto the optical disc 10 to reproduce data. During data recording, recording data obtained from a controller 20 is modulated by an encoder 18 and converted to a driving signal at a LD driver 16 so as to drive laser diodes (LD) of the optical pickup 14. During data reproduction, the amount of reflected light is converted to an electric signal by a four-segmented photo detector in the optical pickup 14. The converted electric signal is provided to an RF signal processor 22 and passed to the controller 20 as reproduction data after demodulation at a decoder 24.

The RF signal processor 22 comprising an amplifier, an equalizer, a binarization unit, and a PLL section boosts and binarizes an RF signal, and then generates a synchronous clock to output to the decoder 24. A reproduction RF signal is also provided to a pre-pit detector 26.

When pre-pits are formed on the optical disc (for example, a DVD-R disc), the pre-pit detector 26 detects signal components of pre-pits contained in the reproduction RF signal and passes the detected signal components to the controller 20.

The controller 20 comprising a microcomputer or the like provides the encoder 18 with the recording data along with pre-pit detection information. The encoder 18 modulates the recording data. In the DVD-R or the like, the encoder 18 also provides the LD driver 16 with a data signal in which synchronous information is inserted at regular intervals based on the pre-pit detection information.

A tilt detector 28 detects the inclination of an optical axis of laser light relative to the optical disc 10 (tilt) based on the signal from the RF signal processor 22 and provides the detected information to the controller 20. More specifically, a signal level of reflected light signals provided from the RF signal processor 22 is detected at a predetermined timing, the obtained signal level is provided to the controller 20 as the amount of tilt. The tilt detector 28 can therefore be easily configured with a sample-and-hold circuit. Sampling timing is determined by a sampling pulse provided from the controller 20 or the encoder 18.

The controller 20 searches for a position where the tilt becomes small, that is, where the optical disc 10 becomes almost perpendicular to the optical axis of laser light on the basis of the amount of tilt detected at the tilt detector 28, and provide a control signal to a tilt driver 30. The tilt driver 30 adjusts the inclination of the optical pickup 14 according to the control signal sent from the controller 20 to change the amount of tilt.

Figure 10:
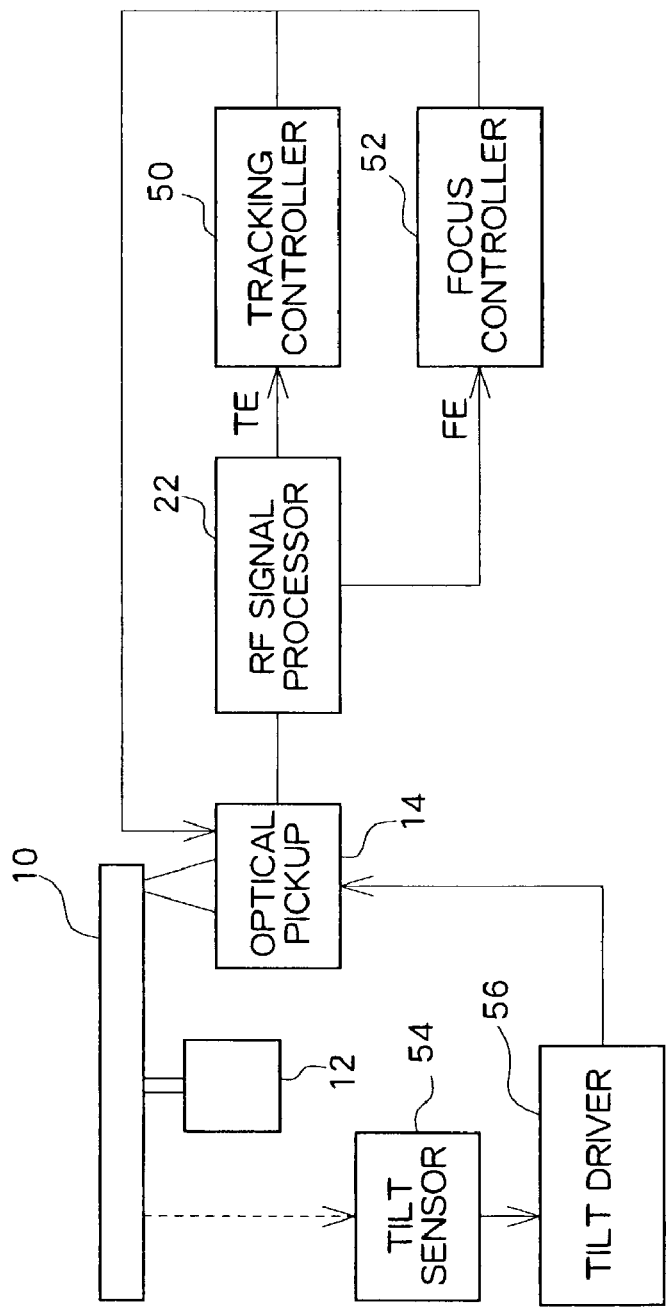
FIG. 10 is a block diagram showing a configuration of an optical disc apparatus in related art.
Figure 11:
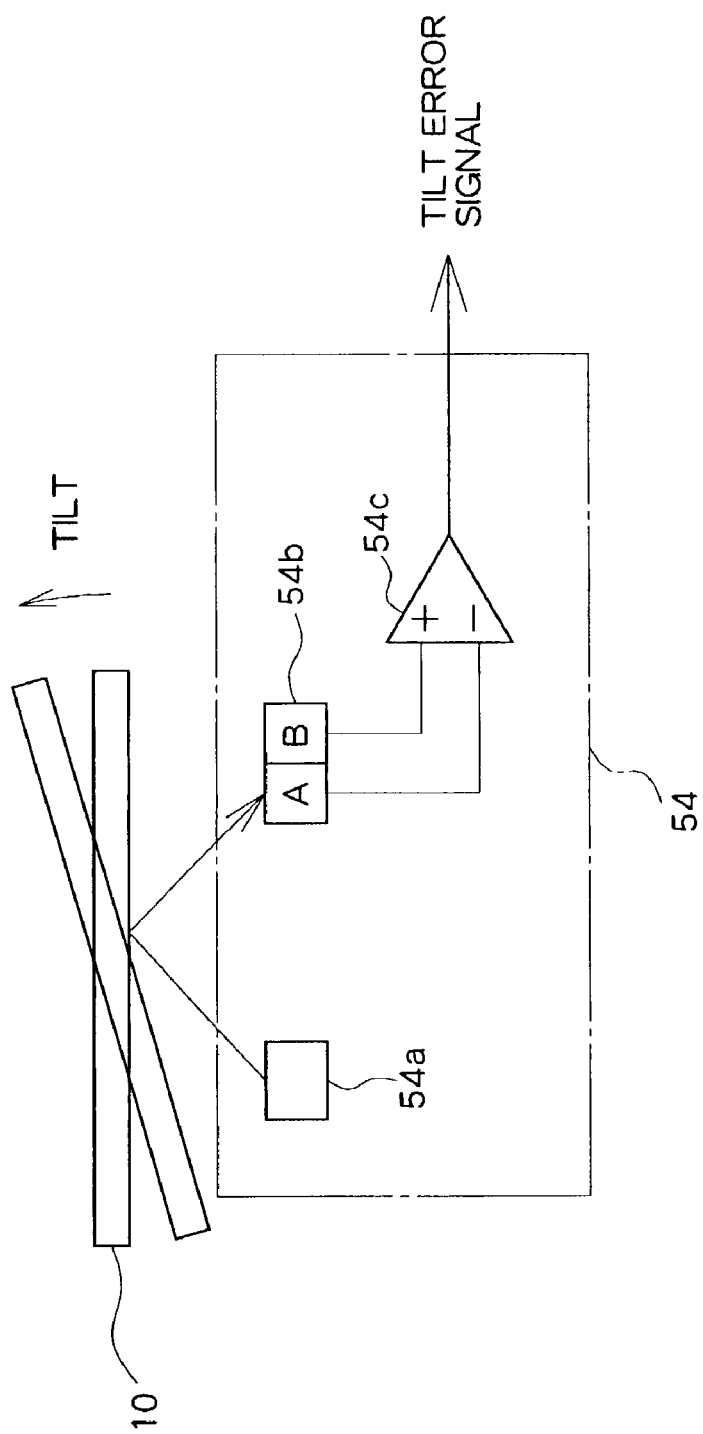
FIG. 11 is a drawing showing the structure of a tilt sensor in related art.

Although controllers 50 and 52 in which focus error and tracking error signals are generated to control focusing and tracking by a focus servo and a tracking servo are used in addition to the above-described components as shown in FIG. 10, detailed description of these components is not included herein.

Figure 2A:
FIG. 2A is a timing chart for a recording data signal.

FIGS. 2A, 2B, 2C, and 2D show timing charts representing detection processing in the tilt detector 28. FIG. 2A shows recording data passed from the controller 20 to the encoder 18, having a structure in which marks and spaces are allocated in alternate order. In the case of a CD-R/RW, data of 3T to 11T exists and in the case of a DVD-R, data comprising 3T to 14T exists. Data of 14T is synchronous data. Laser light at recording power is irradiated during mark periods and laser light at reproducing power (bias power) or at erasing power is irradiated during space periods.

Figure 2B:
FIG. 2B is a timing chart for a recording pulse signal corresponding to the recorded data shown in FIG. 2A.

FIG. 2B shows recording pulses provided from the encoder 18 in the DVD-R. When a single mark is formed, the mark is formed by a plurality of pulses (multi-pulse or a pulse train) rather than a single pulse. The pulse train is generated by overlaying reproducing power Pr on recording power Pw. In FIG. 2B, three pulses are allocated to the single mark. The number of pulses and a duty factor are appropriately adjusted corresponding to the length of the mark to be recorded.

Figure 2C:
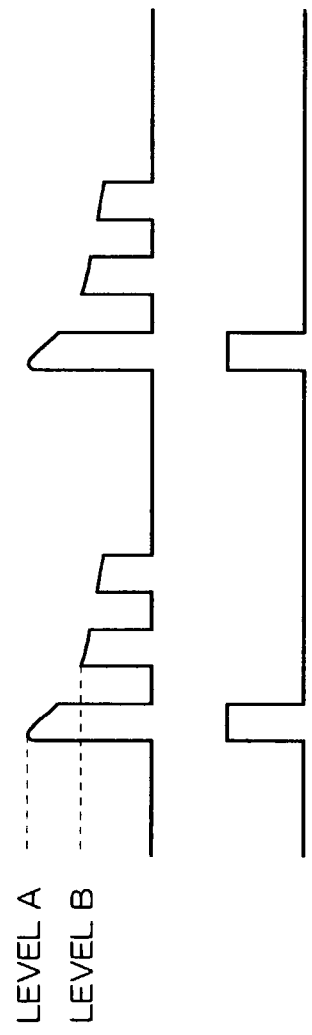
FIG. 2C is a timing chart for a reflected light signal at the recording pulses shown in FIG. 2B.

FIG. 2C shows a reflected light signal obtained when laser light of which power is modulated by recording pulses of FIG. 2B is irradiated on the optical disc 10. Because no pits have yet formed at the point when irradiation at recording power Pw is begun, laser light at recording power PW itself is completely reflected and emerges as a reflected light signal. The reflected light signal detected at this time is taken as a level A. After some time, pits are formed by the laser light at recording power Pw such that the amount of reflected light decreases due to diffraction caused by the pits. In the end, the amount of reflected light is settled at a constant level B. The level B holds values reflecting the degree of forming the pits and the amount of tilt, on the other hand, the level A represents the amount of reflected light obtained when no pits are formed, in other words, it holds values directly reflecting the amount of tilt. The reflected light signal shown in FIG. 2C is sampled and held by a sampling pulse, from which the reflected light signal corresponding to the amount of tilt can be retrieved by just extracting the level A.

Figure 2D:
FIG. 2D is a timing chart for a sampling pulse.

FIG. 2D shows sampling pulses provided to the tilt detector 28. The sampling pulses, which rise at the same timing as, or a slightly earlier timing than, the leading edge of the marks and fall down at a short time interval, are generated at timing with reference to the leading edge of the marks of recording pulses.

Figure 3:
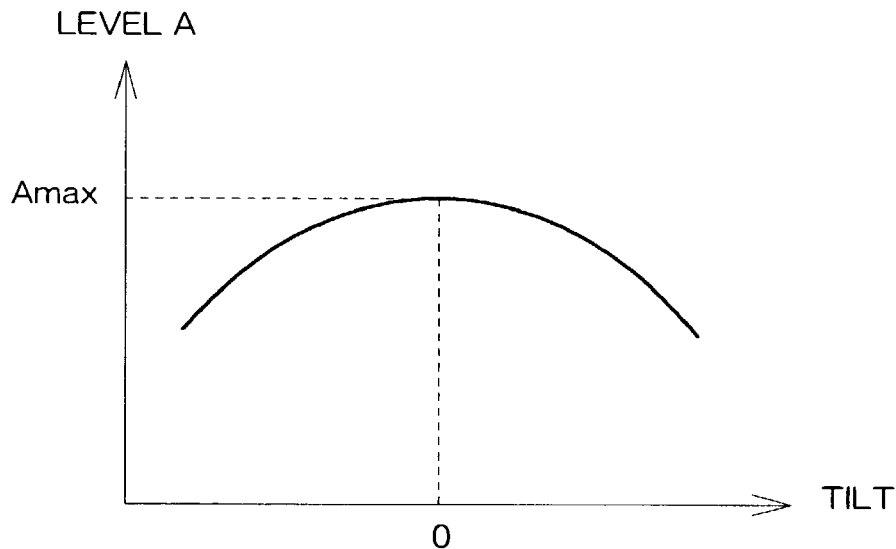
FIG. 3 is a graph showing a relationship between the amount of tilt and a level A.

In FIG. 3 is shown a relationship between the amount of tilt and the level A which is sampled and held at the tilt detector 28 and then output from the tilt detector 28. In this figure, the amount of tilt is plotted along the abscissa and values at the level A along the ordinate. When the amount of tilt is zero, in other words, when the optical disc 10 is almost perpendicular to the optical axis of laser light (the optimum tilt), the value of level A reaches its maximum value, Amax. Values at level A decrease as the amount of tilt increases in either the positive or negative direction. Based on this relationship between the amount of tilt and the level A, the controller 20 adjusts the inclination of the optical pickup 14 so as to increase the value at the level A detected at the tilt detector 28.

It is also possible to detect level A by holding the peak reflected light signal instead of sampling and holding the reflected light signal by the sampling pulse.

Control of the amount of tilt based on the values at level A in the controller 20 will be described in details below.

Figure 4:
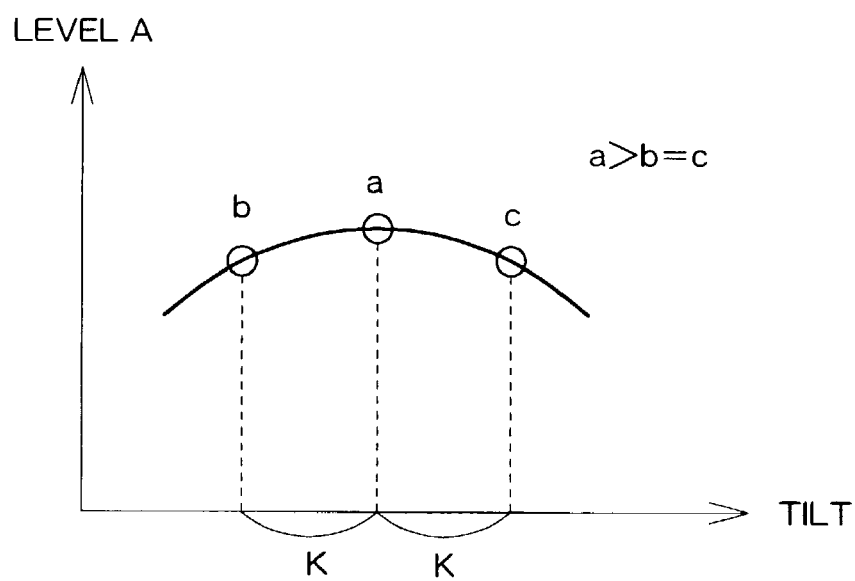
FIG. 4 is a graph showing a change in the level A as the amount of tilt is changed.
Figure 5:
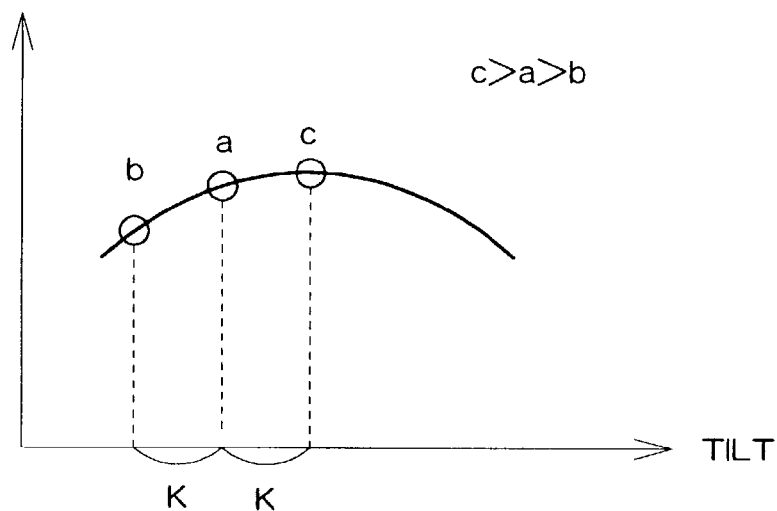
FIG. 5 is a graph showing another type of change in the level A as the amount of tilt is changed.

FIGS. 4 and 5 schematically depict control of the amount of tilt in the controller 20. First, the controller 20 detects the values at the level A under a plurality of different tilt states. More specifically, the current level A value detected by the tilt detector 28 is taken as "a"; the level A value obtained by the tilt detector 28 when the tilt of the optical pickup 14 is increased from the current state by a value K in the positive direction is taken as "b"; and the level A value obtained by the tilt detector 28 when the tilt of the optical pickup 14 is increased from the initial state by a value K in the negative direction by the controller 20 is taken as "c". These three values at the level A are compared to find relationship in magnitude. For example, when a>b=c as shown in FIG. 4, the maximum value is the initial value a. Accordingly, the amount of tilt is reduced back to the initial value and data is recorded/reproduced in this state. On the other hand, when c>a>b as shown in FIG. 5, the controller 20 adjusts the optical pickup 14 so as to obtain the amount of tilt of c and then records/reproduces data.

As has been described above, by controlling the tilt so as to continuously maximize level A, it becomes possible to adjust the optical axis of laser light so that it will be almost perpendicular to the optical disc 10.

Figure 6:
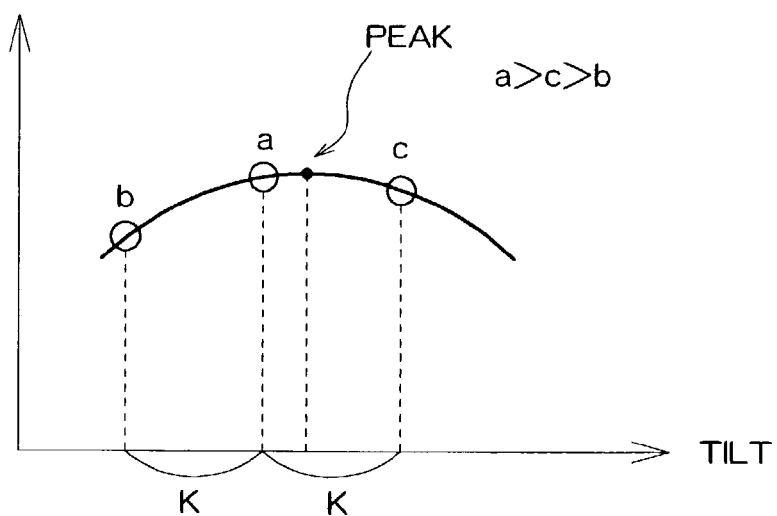
FIG. 6 is a graph showing still another type of change in the level A as the amount of tilt is changed.

Because there is a possibility that the peak value at the level A locates between the values a and c as shown in FIG. 6 when a>c>b, the amount of tilt may be adjusted to be the amount of tilt located at the midpoint position between the amounts of tilt a and c instead of the amount of tilt a.

Figure 7:
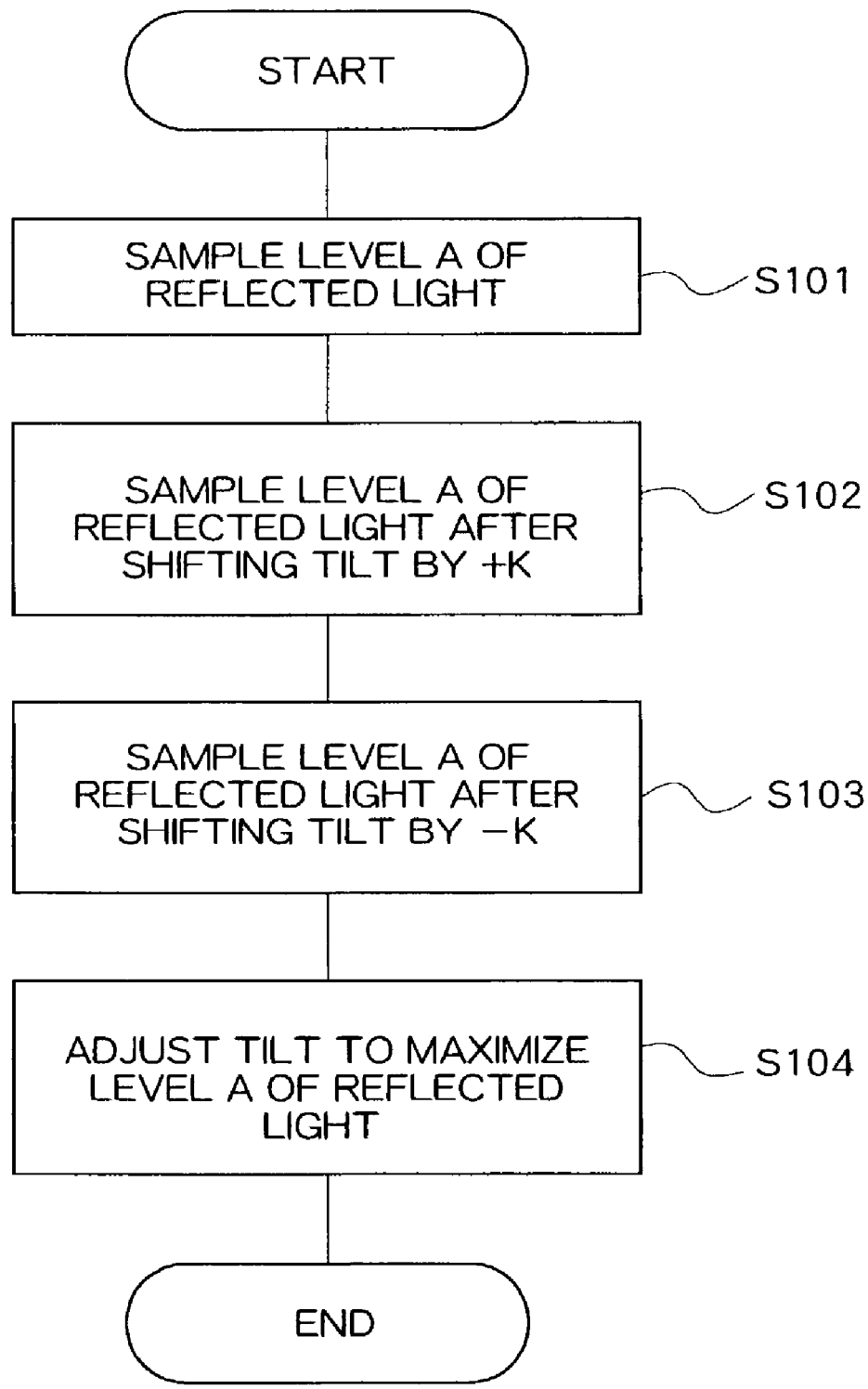
FIG. 7 is a process flowchart.

FIG. 7 shows a process flowchart of the above-described tilt detector 28 and the controller 20. First, the tilt detector 28 samples and holds the level A of the reflected light signal under the current state and outputs the sampled level A to the controller 20 (S101). Next, the controller 20 stores the value for level A passed from the tilt detector 28 in a memory 21 and then tilts the optical pickup 14 by +K. Under the tilt state of +K, the tilt detector 28 samples and holds the level A of the reflected light signal and then outputs the sampled level A to the controller 20 (S102). Then, the controller 20 stores the value b at the level A under the tilt state of +K in the memory 21 and then tilts the optical pickup 14 by −K from the initial state. Under the tilt state of −K, the tilt detector 28 samples and holds the level A and then outputs the sampled level A to the controller 20 (S103). The controller 20 stores the value c at level A in the memory 21. After storing the values a, b, and c at level A under the three different states, the controller 20 selects the maximum value at level A from the three values a, b, and c and controls the optical pickup 14 to cause the amount of tilt to be the selected maximum value (S104). In step S104, when a>c>b, it is also preferable to use the amount of tilt intermediate between the values a and c calculated by the following equation as the optimum amount of tilt:

$$T = T\text{mid} + (T\text{max} - T\text{mid})/2 \qquad \text{[Equation 1]}$$

where Tmax is the amount of tilt which provides the value a and Tmid is the amount of tilt which provides the value c. The processing steps for detecting and controlling the tilt (S101 to S104) shown in FIG. 7 are periodically executed as interrupt. By dividing the tracks of the optical disc 10 into three segments respectively comprising tracks at the inner radius, at the middle radius, and at the outer radius of the optical disc 10, the processing steps of FIG. 7 may be executed once or a plurality of times in each of the segments.

Tilting of the optical pickup 14 may be achieved using, for example, an actuator capable of inclining an object lens holder located in the optical pickup 14 by a predetermined amount toward the radial direction of the optical disc 10. Such an actuator may be constructed by, for example, installing a pair of permanent magnets on a lens holder in the radial direction, locating a pair of drive coils on a yoke which is equipped on the fixed side for elastically supporting the lens holder so as to be opposed to each other, and supplying a current to the drive coils from the tilt driver 30 to exert a force acting in the opposite directions to each other on the pair of the permanent magnets.

In the present embodiment, as has been described, when laser light whose power is modulated by the recording pulses is irradiated on the optical disc to record data, the amount of reflected light is detected while no pits are formed at the beginning of irradiation at recording power in order to perform tilt control for making the detected amount of reflected light larger. As a result, it becomes possible to reliably control the tilt.

FIGS. 8A, 8B, 8C, and 8D show timing charts representing another detection processing in the tilt detector 28. In the earlier example, the amount of tilt is controlled so as to make the reflected light signal larger by sampling and holding the amount of reflected light while no pits are formed at the beginning of the mark periods. In the present example, the reflected light signal is sampled and held during the space periods of the recording pulses. Because no pits are formed and laser light of reproducing power is irradiated onto the optical disc in the space period, the amount of reflected laser light at the reproducing power is not influenced by the pits and increases/decreases depending only on the amount of tilt of the optical disc 10. By sampling and holding the reflected light signal during the space periods and performing the tilt control for making the signal level of the reflected light larger, it becomes possible to adjust the optical axis of laser light so that it will be almost perpendicular to the optical disc.

Figure 8A:
FIG. 8A is a timing chart for a recording data signal.
Figure 8B:
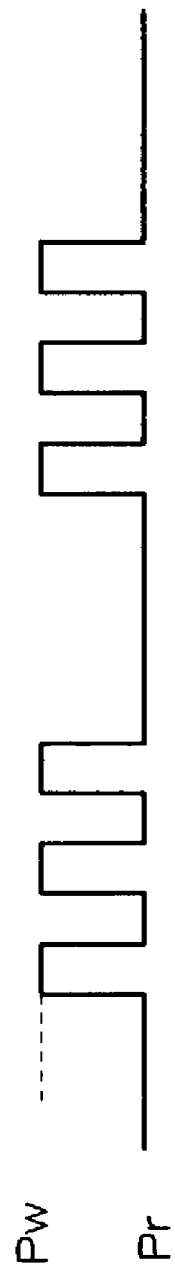
FIG. 8B is a timing chart for a recording pulse signal corresponding to the recorded data shown in FIG. 8A.
Figure 8C:
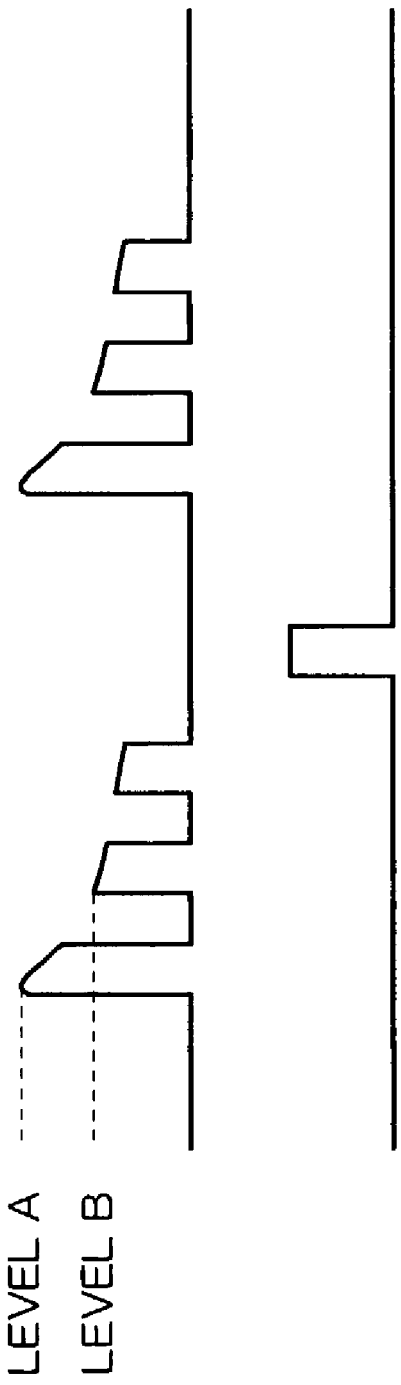
FIG. 8C is a timing chart for a reflected light signal at the recording pulses shown in FIG. 8B.
Figure 8D:
FIG. 8D is a timing chart for a sampling pulse.

FIGS. 8A, 8B, and 8C are similar to FIGS. 2A, 2B, and 2C, respectively. FIG. 8D shows a sampling pulse which is synchronized with the space period. The tilt detector 28 samples and holds the reflected light signal using this sampling pulse and outputs the sampled signal to the controller 20. The controller 20 varies the tilt of the optical pickup 14 in three levels to detect levels of the reflected light signal and establishes the optical pickup 14 to the amount of tilt at which the maximum level is obtained.

The sampling pulse shown in FIG. 8D may be generated by the controller 20 or the encoder 18 in synchronism with the space periods of the recording pulses. The space periods includes 3T to 11T in the case of CD-R/RW and 3T to 14T in the case of DVD-R/RW. It is also preferable to generate the sampling pulse in synchronism with the space periods of 11T or 14T and perform the tilt control at the space periods of 11T or 14T.

FIGS. 9A, 9B, 9C, and 9D show timing charts representing still another detection processing in the tilt detector 28. In this example wherein it is assumed that the device is a DVD-RW device, the power of the laser light is modulated in three levels of erasing power, recording power, and reproducing power. When data is rerecorded onto an optical disc on which data has already been recorded, the previously recorded data is deleted by erasing power so that new data can be recorded.

As shown in FIG. 9B, laser light at erasing power Pe is irradiated during the space periods and a plurality of laser beams at recording power Pw are irradiated to form the pits during the mark periods. In the mark periods, recording power Pw and reproducing power Pr occur sequentially. In this example, the tilt detector 28 also samples and holds the reflected light signal during the space periods just as in the case of FIG. 9D and provides the detected level of the returned signal to the controller 20. Because erasing power is applied in the space periods, by establishing erasing power to an adequate level, it becomes possible to delete the previous data recorded on the optical disc even when the optical disc 10 is tilted to a certain extent. In such a case, the reflected light signal of laser light irradiated at erasing power and reflected from the optical disc 10 is obtained while no pits are formed on the optical disc 10 and therefore the level of the signal increases/decreases depending on the amount of tilt of the optical disc 10 (refer to FIG. 9C for the reflected light signal). Accordingly, the controller 20 controls the amount of tilt of the optical pickup 14 in three levels and detects the level of reflected light signal obtained when erasing power is applied and then establishes the amount of tilt so as to obtain the maximum reflected light signal. As a result, it becomes possible to control tilt without influence exerted by the pits. Because both the existence of the pits and the occurrence of tilt act in the same direction of reducing the level of the reflected light signal obtained at the erasing power even when the erasing power is not adequate, it is possible to execute tilt control by selecting the position on which the level of the reflected light signal obtained at erasing power becomes maximum.

Although the present invention has been described as related to the preferred embodiment, it is to be understood that the invention is not limited to the specific embodiment thereof and that changes and modifications may be made without departing from the spirit and scope of the invention.

For example, although the controller 20 increases/decreases the amount of tilt by the same amount in different directions with reference to the current state taken as a center position in this embodiment, it is also possible to detect the reflected light signal while tilt is changed from the current state to an established direction. In this case, when the level detected after the tilt is changed is higher than the initial level, the tilt is increased by the same amount in the same direction, and when the detected level is lower than the initial level, the tilt is decreased in the opposite direction.

What is claimed is:

1. An optical disc apparatus comprising:
    irradiation means for irradiating laser light onto an optical disc, the laser light being modulated at a recording power;
    detection means for detecting an amount of light reflected from said optical disc;
    sampling means for sampling said amount of reflected light at predetermined timing, the predetermined timing being one of a time where a pit has yet to be formed in said optical disc and a time where a space period of said optical disc occurs; and
    adjustment means for adjusting the inclination of an optical axis of laser light relative to said optical disc so as to increase the amount of reflected light obtained at said predetermined timing.

2. An optical disc apparatus according to claim 1, wherein said adjustment means comprising:

changing means for varying the inclination of the optical axis of laser light relative to said optical disc and storage means for storing the amounts of reflected light sampled responding to each change of the inclination, wherein said adjustment means adjusts the inclination of the optical axis of laser light based on the stored amounts of reflected light.

3. An optical disc apparatus according to claim 2, wherein said changing means varies the inclination of the optical axis of laser light relative to the optical disc in different directions a plurality of times.

4. An optical disc apparatus according to claim 2, wherein said adjustment means adjusts the inclination of the optical axis of laser light so as to correspond to the inclination corresponding to the maximum value of the amounts of reflected light stored in said storage means.

5. An optical disc apparatus according to claim 2, wherein said adjustment means calculates the inclination at which the amount of reflected light becomes maximum using the amounts of reflected light stored in said storage means to adjusts the inclination based on the calculated result.

6. An optical disc apparatus according to claim 1, wherein said adjustment means adjusts the inclination of the optical axis of laser light at regular intervals.

7. An optical disc apparatus comprising:

irradiation means for irradiating laser light at a recording power and an erasing power onto an optical disc;

detection means for detecting an amount of light reflected from said optical disc;

sampling means for sampling said amount of reflected light at a predetermined timing; and adjustment means for adjusting the inclination of an optical axis of laser light relative to said optical disc so as to increase the amount of reflected light obtained at said predetermined timing, wherein said predetermined timing occurs at one of a time where the laser light is at the recording power level and a pit has yet to be formed in said optical disc, and a time where a space period of said optical disc occurs.

* * * * *

UNITED STATES PATENT AND TRADEMARK OFFICE
CERTIFICATE OF CORRECTION

PATENT NO. : 7,133,340 B2
APPLICATION NO. : 10/253856
DATED : November 7, 2006
INVENTOR(S) : N. Takeda It is certified that error appears in the above-identified patent and that said Letters Patent is hereby corrected as shown below:

| COLUMN | LINE | ERROR |
|---|---|---|
| (56) Pg. 1, col. 2 | Refs. Cited, (U.S. Pats., Item 7) | "Schröder et al." should read --Schroder et al.-- |
| (57) Pg. 1, col. 2 | Abstract 6 of text | "ye" should read --yet-- |
| 9 (Claim 2, | 2 line 4) | "disc and" should read --disc; and-- |
| 9 (Claim 5, | 22 line 5) | "adjusts" should read --adjust-- |

Signed and Sealed this

Twenty-third Day of January, 2007

JON W. DUDAS
*Director of the United States Patent and Trademark Office*